United States Patent
Giladi et al.

(10) Patent No.: US 12,489,605 B2
(45) Date of Patent: Dec. 2, 2025

(54) SAMPLE-PARALLEL SPARSE CIPHER-BLOCK CHAINING (CBCS) ENCRYPTION

(71) Applicant: Comcast Cable Communications, LLC, Philadelphia, PA (US)

(72) Inventors: Alexander Giladi, Denver, CO (US); Andrew Morrow, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 913 days.

(21) Appl. No.: 17/535,231

(22) Filed: Nov. 24, 2021

(65) Prior Publication Data

US 2022/0166604 A1 May 26, 2022

Related U.S. Application Data

(60) Provisional application No. 63/118,562, filed on Nov. 25, 2020.

(51) Int. Cl.
| | |
|---|---|
| *H04N 21/2347* | (2011.01) |
| *H04L 9/06* | (2006.01) |
| *H04L 65/612* | (2022.01) |
| *H04L 65/75* | (2022.01) |
| *H04N 21/845* | (2011.01) |
| *H04L 9/00* | (2022.01) |

(52) U.S. Cl.
CPC .......... *H04L 9/0637* (2013.01); *H04L 65/612* (2022.05); *H04L 65/762* (2022.05); *H04N 21/2347* (2013.01); *H04N 21/23476* (2013.01); *H04N 21/8456* (2013.01); *H04L 9/50* (2022.05); *H04L 2209/125* (2013.01)

(58) Field of Classification Search
None
See application file for complete search history.

(56) References Cited

U.S. PATENT DOCUMENTS

| | | | |
|---|---|---|---|
| 2010/0153747 | A1 | 6/2010 | Asnaashari et al. |
| 2015/0156174 | A1* | 6/2015 | Fahey ..................... H04L 63/18 713/168 |
| 2017/0347065 | A1 | 11/2017 | Krishnan et al. |
| 2020/0145701 | A1* | 5/2020 | Liu ........................ H04N 5/783 |
| 2020/0150895 | A1* | 5/2020 | Kim ....................... G06F 3/0679 |
| 2022/0198114 | A1* | 6/2022 | Raumann ................ G06F 13/28 |
| 2023/0089495 | A1* | 3/2023 | Sanchez De La Fuente et al. ..... H04N 21/435 725/86 |
| 2023/0102374 | A1* | 3/2023 | Zhu .......................... H04L 9/12 726/26 |

FOREIGN PATENT DOCUMENTS

CN 104284208 A 1/2015

* cited by examiner

*Primary Examiner* — Nelson S. Giddins
(74) *Attorney, Agent, or Firm* — BakerHostetler (57) ABSTRACT

A content provider in a content distribution system may be configured to reduce latency in a content distribution system by storing multiple frames from a sequence of frames in different buffers and encrypting, in parallel, the frames stored in the different buffers. For example, the content provider may encrypt each buffer via a different instruction pipeline of a processor.

37 Claims, 6 Drawing Sheets

SAMPLE-PARALLEL SPARSE CIPHER-BLOCK CHAINING (CBCS) ENCRYPTION

CROSS REFERENCE TO RELATED APPLICATIONS

This application claims the benefit of U.S. patent application Ser. No. 63/118,562, filed Nov. 25, 2020, which is hereby incorporated by reference in its entirety.

BACKGROUND

Adaptive bitrate streaming is a method of streaming content to one or more computing devices over a network. A content distribution system utilizing adaptive bitrate streaming may be configured to segment a content asset, such as a movie or television show, into a number of smaller content segments, each segment containing a short interval (e.g., two seconds) of playback time of the content asset. The segments may be made available by the content provider at a variety of different bit rates. When a computing device requests playback of the content asset from the content provider, the device may select, from the variety of different bit rates, the next segment to download and playback based on current network conditions. For example, the device may select the segment with the highest bit rate that can be downloaded in time for playback without causing stalls or re-buffering events in the playback. As network conditions improve or deteriorate, the device may request a subsequent segment of the content asset having a higher or lower bit rate reflective of the network conditions.

In order to provide secure streaming, a content distribution system may encrypt streaming content using the Advanced Encryption Standard Cipher-Block Chaining (AES-CBC) mode of operation. For example, the AES-CBC mode of operation may be used in adaptive streaming for full-segment AES-CBC encryption or a Common Encryption sparse CBC ("CBCS") mode. In the CBCS mode, an AES-CBC pattern encryption of N continuous blocks of data may be followed by M blocks of unencrypted data, e.g., encrypting every 10th 16 bytes (N=1) block and skipping 9 (M=9). Because encryption of each subsequent block in AES-CBC encryption depends on the result of encrypting the preceding block, AES-CBC encryption often increases latency in a content distribution system. Thus, improvements are needed.

SUMMARY

Systems and methods are described herein for reducing latency in a content distribution system. A content provider associated with a content distribution system may receive a content asset, such as a movie asset, a television asset, a live broadcast asset, an audio asset or a Video on Demand (VOD) asset. The content asset may be stored or received by the content provider as a single content asset including one or more content segments (e.g., each of the one or more segments including a sequence of frames). Prior to sending a requested segment of the content asset to a requesting playback device, the content provider may need to encrypt the content in that segment.

The content provider may be configured to store multiple frames of a sequence of frames in different buffers and encrypt, in parallel, the frames stored in the different buffers. For example, the content distributor may encrypt (e.g., by utilizing an AES-CBC encryption function) each buffer via a different instruction pipeline of a processor, e.g., where processing a buffer in a pipeline is offset from processing another buffer in another pipeline by one or more instruction cycles of the processor. In order to further reduce latency, the content distributor may store and encrypt a frame from another sequence of frames in a buffer after encrypting a frame from the first sequence of frames, e.g., in parallel with encrypting frames from the first sequence of frames in other buffers. In order to reduce latency associated with accessing portions of segments from RAM, the content distributor may fetch blocks that need to be encrypted and construct buffers for a next invocation of encryption via a scatter-gather operation (e.g., eliminating accessing skipped portions of segment from RAM).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure

BRIEF DESCRIPTION OF THE DRAWINGS

The following drawings show generally, by way of example, but not by way of limitation, various examples discussed in the present disclosure. In the drawings.

DETAILED DESCRIPTION

Methods and systems are described herein for reducing latency in a content distribution system. At least a portion of each frame of a plurality of frames of a content asset may be encrypted in parallel with encryption of the other frames of the content asset. The frames of the content asset may be part of a content segment of the content asset.

In a content distribution system that utilizes adaptive bit rate streaming, a content asset may be segmented into a number of smaller content segments, each segment containing a short interval (e.g., two seconds) of playback time of the content asset. Each segment of the content asset may include a number of video frames, e.g., where each video or audio frame is stored as an ISO-BMFF sample with one or more subsamples (corresponding to H.264/H.265/H.266 NAL units). Given that AES-CBC encryption requires using a pattern of 16-byte blocks where encryption of each subsequent block depends on the result of encrypting the preceding block, in many cases an AES instruction takes more than a single central processing unit (CPU) clock cycle. Accordingly, over the course of encrypting each video frame of each segment, a period of latency may be introduced between a time of receipt of a request for a content segment (e.g., from a user device) and a time the content segment is made available for playback by one or more user devices.

Figure 1:
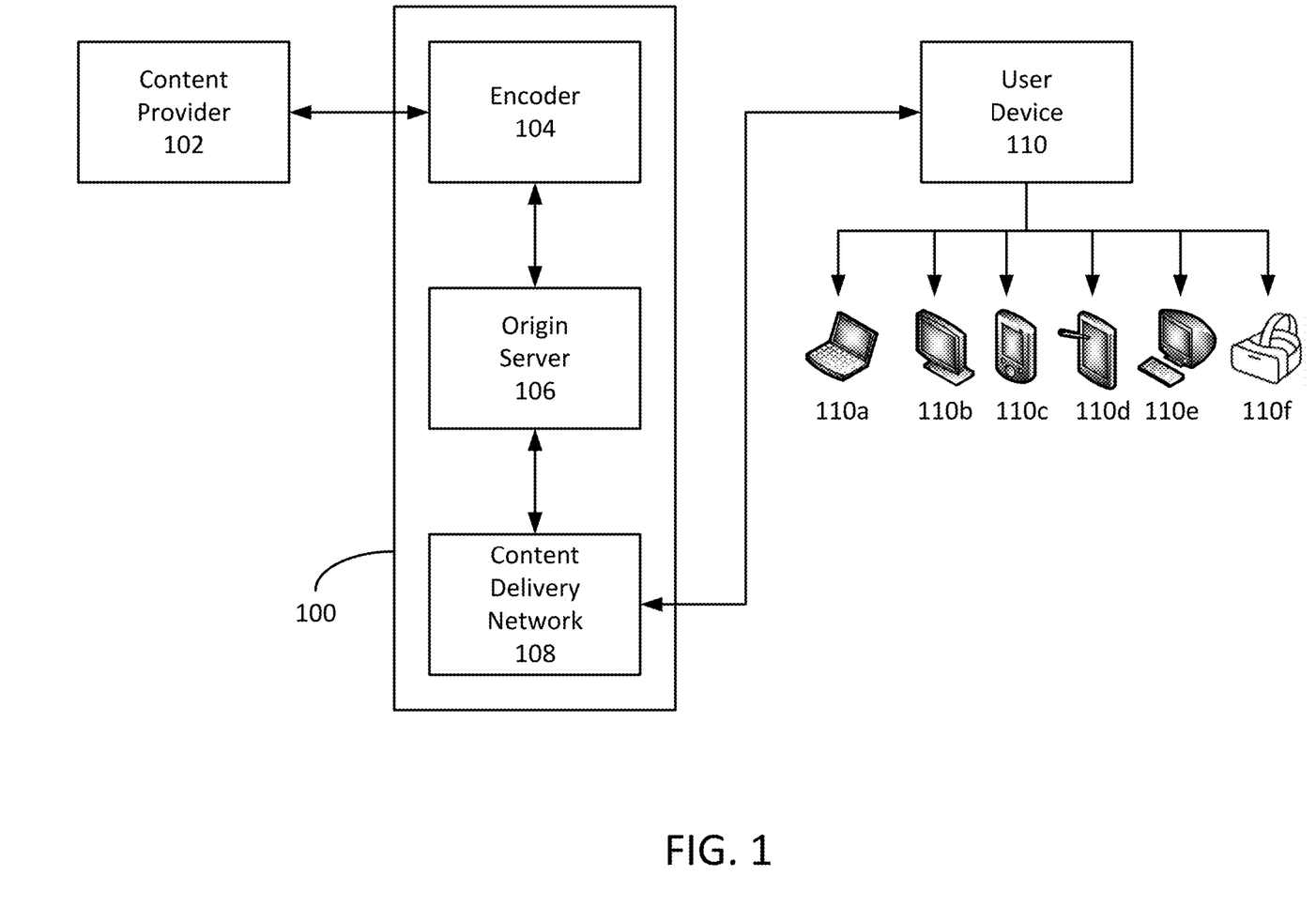
FIG. 1 shows an example system.

FIG. 1 shows an example content delivery system 100. A content provider 102, such as a service provider (e.g., Internet content distributor, cable television content distributor, etc.), may receive a content asset. The content asset may include one or more content segments and each content segment may include a sequence of separate frames.

The content provider 102 may encrypt each frame (e.g., a portion of each frame) of a plurality of frames of a segment of the content asset, in parallel, where each frame of the content asset and the other frames of the content asset are encrypted separately and simultaneously. Latency may be reduced by encrypting multiple frames of the content asset in parallel, in contrast to encrypting each frame of a segment linearly. The content provider 102 may transmit encrypted content segments (e.g., including the encrypted frames) of the content asset using, for example, an Internet Protocol (IP) network, such that the encrypted content segments are available for playback by a user device.

The system 100 may comprise an encoder 104. An input of the encoder 104 may receive a content asset from one or more sources. The content asset may be received in any one of a variety of formats, such as, for example, H.262, H.264, H.265, MPEG-4 Part 2, or MPEG-2, and may be transmitted using one or more standards such as SCTE-35 or other specifications. Although reference may be made to example standards (e.g., MPEG) and formats, one of skill in the art will recognize that the systems and methods described herein are applicable to any format or standard that support audio and/or video. The combined MPEG-1, MPEG-2, and MPEG-4 or other MPEG standards are hereinafter referred to as MPEG.

A content asset, such as a program, may comprise a group of one or more PIDs that are related to each other. For instance, a multi program transport stream used in digital television might contain three programs, to represent three television channels. In some examples, each channel may comprise one video stream, one or two audio streams, and any necessary metadata. A receiver wishing to tune to a particular "channel" merely has to decode the payload of the PIDs associated with its program. The receiver may discard the contents of all other PIDs.

In some embodiments, the encoder 104 may receive, from the content provider 102, an uncompressed content asset having a maximum playback resolution. For example, the content asset may be received at the encoder 104 at a High Definition (HD), Ultra High Definition (UHD), 4K Ultra High Definition (4K) or High Dynamic Range (HDR) playback resolution. The encoder 104 may be configured to encode each frame of the received content asset individually and separately from the plurality of other frames of the content asset. The encoder 104 may encode a given frame of the content asset using Joint Photographic Expert Group (JPEG) compression techniques, such as JPEG 2000 compression. However, it is understood that any other type of compression technique may be used. Each frame of the received content asset may be encoded to a plurality of pixel resolutions (e.g., 1280×720, 1024×578, 640×360, 512×288, etc.) and sent individually and separately to the origin server 106.

The origin server 106 may be configured to receive and fulfill a request from any of the user devices 110, via the content delivery network 108, to deliver one or more segments of the content asset to the device 110 for playback. The request from the device 110 to deliver one or more segments of the content asset may comprise an identification of the user (e.g., an account identifier, a username and/or a password), the device 110, the requested content asset, and/or a playback time point or temporal location. In certain aspects, the request to deliver one or more segments of the content asset may reflect a user skipping to a particular portion of a content asset of which the initial segments of the content asset have already been delivered and played on the device 110.

The origin server 106 may be configured to generate a manifest file associated with the content asset. Generally, the manifest may contain information describing various aspects of the associated content asset that may be useful for the device 110 to playback the content asset and/or for the content provider 102 to store and retrieve the program. For example, a manifest file may identify each of the plurality of segments of the content asset, the number of segments included in the content asset, and/or the proper ordering of the segments necessary to effectuate playback of the content asset. A manifest file may comprise a network location (e.g., a hyper-text transfer protocol (HTTP) uniform resource locater (URL) link or other universal resource identifier (URI)) for each segment that may be downloaded, accessed, or retrieved. It will be appreciated that the network locations included within a manifest file may point to more than one different location or source.

The manifest file may be provided to any of the devices 110 in response to a request to receive a program. The device 110 may use the manifest file to determine the segments required to play the program or a portion of the program and may subsequently download the required segments using the network locations specified in the manifest file. Upon receiving a request to deliver a content asset to the device 110, the origin server 106 may provide one or more manifest files to the device 110 via the content delivery network 108 that describe the program and segments thereof, including network locations from which each segment of the content asset may be downloaded. Using the manifest file, the device 110 may iteratively download and begin playback of the content asset.

The content delivery network 108 may be configured to act as an intermediary server located between the user device 110 and the content provider 102. More particularly, the content delivery network 108 may be configured to serve cached objects to the user device 110 and to manage some or all aspects of the cached objects of the user device 110. Such architecture may reduce the cost, resource, and bandwidth usage and may improve the security of user device 110. For example, instead of validating the cached objects by committing various resources and using bandwidth to connect to a plurality of network-based resources, user device 110 needs only to request the validation from the content delivery network 108. In turn, the content delivery network 108 may connect to the plurality of network-based resources, such as the origin server 106, to refresh the cached objects, and return the refreshed objects to user device 110.

A user device 110 may comprise, for example, at least one of a laptop 110a, a television 110b, a smartphone 110c, a tablet 110d, a desktop 110e, a VR headset 110f, or any other device capable of presenting content to a user. The user device 110 may interact with the content provider 102 via a user interface associated with the user device 110. Upon this interaction, the content asset or a portion thereof may be delivered to the user device 110 for playback via the content delivery network. It is understood that the term user device 110 as used herein may comprise any combination of a hardware element, such as any of the devices 110a-110f, a set-top cable box, a streaming-video player, or a quadrature amplitude modulation (QAM) client, or a software element, such as a web browser or other software adapted to playback video.

Figure 2:
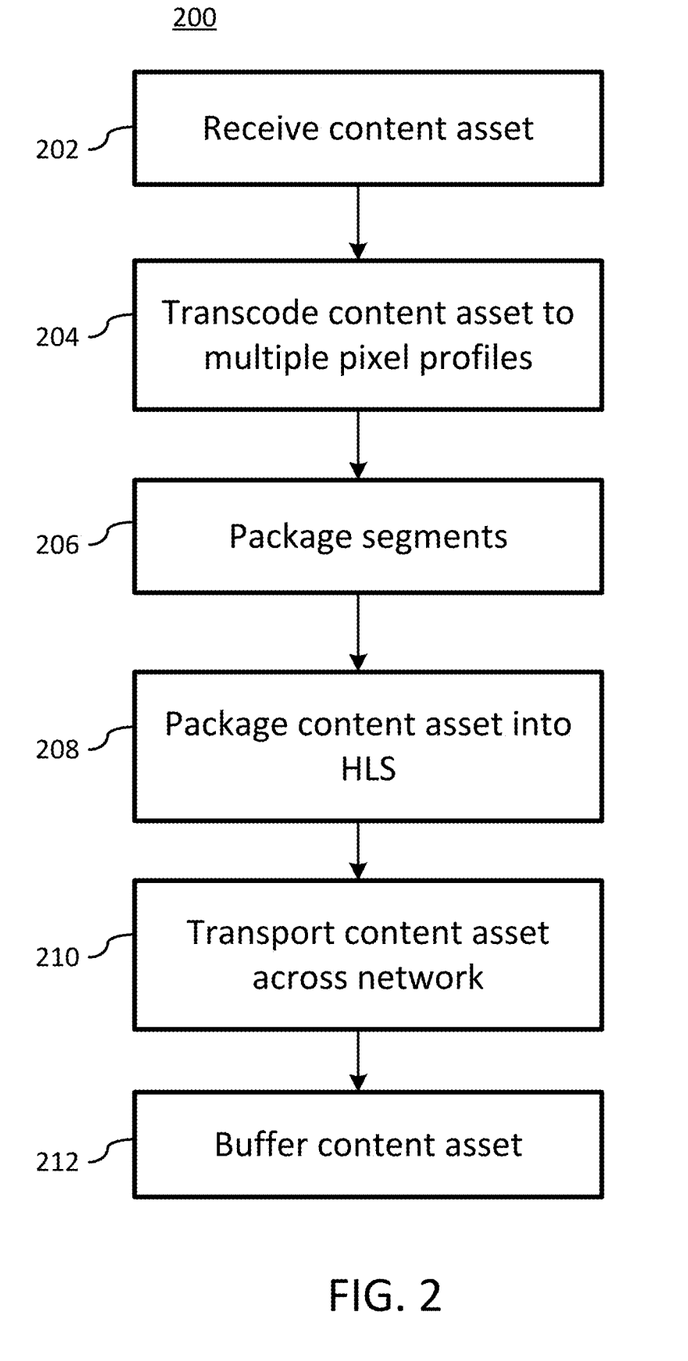
FIG. 2 shows an example method.

FIG. 2 shows an example method 200. According to some embodiments, method 200 may use adaptive bitrate streaming (e.g., utilizing AES-CBC encryption). Application-level encryption, such as the Common Encryption standard (CENC, ISO/IEC 23001-7), cannot necessarily be done in a just-in-time environment where only a single segment is processed in response to an HTTP request.

MPEG DASH is an adaptive bitrate streaming technique that enables streaming of content assets over the Internet delivered, for example, from conventional HTTP web servers. Similar to other adaptive bitrate streaming techniques, MPEG DASH works by breaking a content asset into a sequence of small HTTP-based content segments, each segment containing a short interval (e.g., two seconds) of playback time of the content asset. Each segment may be made available at a variety of different bit rates. While the content asset is being played back by a user device utilizing MPEG DASH, the user device may automatically select the next segment to download and playback based on current network conditions. For example, the user device may select the segment with the highest bit rate that can be downloaded in time for playback without causing stalls or re-buffering of the content asset.

As shown at step 202, a content asset may be received and, as shown at step 204, the content asset received by the content provider 102 may be transcoded. Transcoding the content asset may comprise encrypting the content asset and/or converting the content asset from one video format to another video format, such as one amenable to the means by which the content provider's users view the content. For example, transcoding the content asset may comprise converting the content asset from a Flash Video (FLV) format or MPEG-2 format to an MPEG-4 video stream.

Moreover, as shown at step 204, transcoding the content asset may include compressing the content asset using digital audio/video compression, such as MPEG, or any other type of compression. As further shown at step 204, the content asset may be encoded into multiple pixel profiles. The content asset may be encoded to four additional pixel profiles and, along with the pixel profile of the content asset received by the content provider 102, may be output as a plurality of User Data Protocol (UDP) multicast streams, one stream per output pixel resolution.

At step 206, the content asset may be packaged into a plurality of segments. A packager associated with a transcoder may be configured to receive the plurality of streams output from the transcoder, where each stream may consist of one pixel resolution. The packager may be configured to receive each stream and to assemble each media payload into time-aligned segments of video and audio. Further, the packager may be configured to read the time-alignment indicators in the arriving transmission and to save each resulting media package as a segment, for example, on a RAM disk. At step 208, the segments may be packaged to an alternative format. For example, DASH segments may need to be packaged into an alternative format as many user devices do not support playback of DASH segments.

According to some embodiments, packaging the segments (e.g., into HLS) may include encrypting the content asset, e.g., utilizing AES-CBC encryption. For example, AES-CBC encryption may be used for secure streaming, e.g., where a viewer may access an encrypted video via a web browser and a secure HTTPS connection. Due in part to processing time associated with encryption (e.g., AES-CBC encryption), packaging segments may introduce delivery latency in the content distribution system.

According to some embodiments, at step 208 an open source web server may be used to package the segments into HLS. HLS is an HTTP-based media streaming communications protocol that, similar to MPEG DASH, works by breaking the overall stream into a sequence of small HTTP-based file downloads, each download comprising a segment of an overall potentially unbounded transport stream. As the stream is played, the user device may decrypt any encrypted content and select from a number of different alternate streams containing the same material encoded at a variety of data rates, allowing the streaming session to adapt to the available data rate.

At step 210, each segment may be transported across the content delivery network. The content delivery network may act as an intermediary server located between the user device and the content delivery system. More particularly, the content delivery network may serve the stored segments to the user device and may manage some or all aspects of serving the stored segments to the user device.

At step 212, the content asset may be buffered. Buffering the content asset may comprise preloading the content asset into a reserved area of memory of the user device (i.e., the buffer). Generally, a certain amount of data associated with the content asset must be stored in the buffer before playback of the content segment can begin. Having an advance supply of the content asset prevents playback disruption if there are momentary delays in transmission while the content asset is being played back. For example, playback of a first content asset segment may not begin until the second content asset segment is received at the buffer and buffering the content segment may result in latency at the content distribution system.

Thus, using conventional adaptive bitrate streaming and encryption methods such as MPEG DASH and/or HLS, latency may result between a time of receipt of a request for a content segment (e.g., from a user device) and a time the content segment is made available for playback by one or more user devices. This may be particularly troublesome, for example, in live broadcast such as the broadcasting of a football game, resulting in a significant delay in bringing the live content to the viewer. However, by encrypting each frame of the content asset in parallel, where each frame of the content is encrypted separately from the remaining frames of the content asset, this latency may be reduced.

Figure 3:
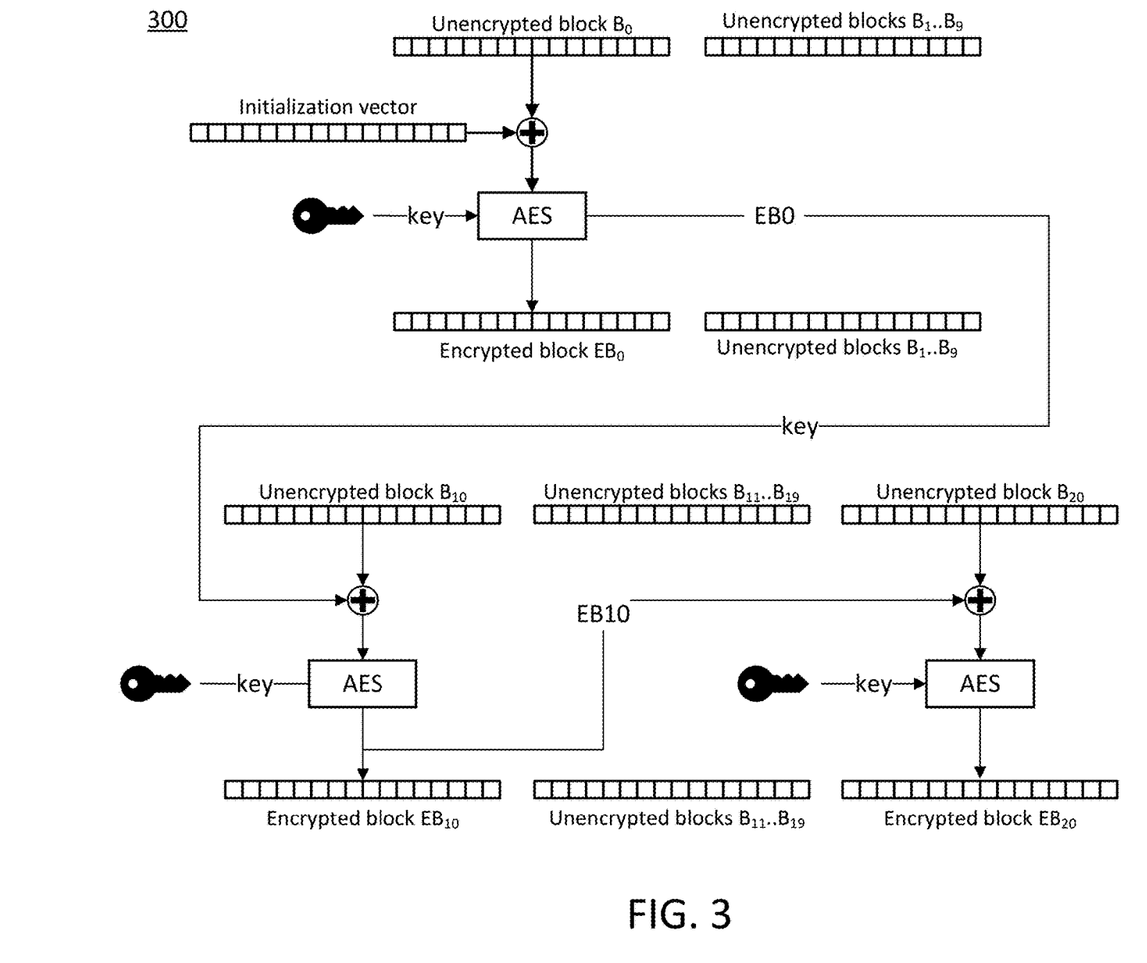
FIG. 3 shows an example method.

FIG. 3 shows an example implementation 300 of AES-CBC encryption. A growing majority of adaptive streaming content is encrypted using the AES-CBC block cipher mode of operation. For example, AES-CBC is used in Apple HTTP Live Streaming (HLS) in MPEG-2 Transport Stream (TS) and is used in ISO Base Media File Format (BMFF) segments in both HLS and Dynamic Adaptive Streaming over HTTP (DASH). For example, AES-CBC may be used in adaptive streaming for full-segment AES-CBC encryption or a Common Encryption sparse CBC ("CBCS") mode. In the CBCS mode, only 16 bytes are encrypted out of every 160 bytes; the encrypted bytes start immediately after the end of a slice header in a slice Network Abstraction Layer (NAL) unit (e.g., in NAL-based video codecs such as ITU-T H.264, ITU-T H.265, and ITU-T H.266).

Each video frame may be stored as an ISO-BMFF sample and each ISO-BMFF sample may have one or more sub-samples (corresponding to H.264/H.265/H.266 NAL units). The CBCS mode may require that the protected range of each subsample be partially encrypted with AES-CBC using a pattern of 16-byte blocks. For example, as illustrated in FIG. 3, if the pattern is 1:9 crypt:skip (required by IETF RFC 8216), then the first 16 byte block B0 of the subsample is encrypted into block EB0 and the next nine times 16 byte blocks (e.g., 144 bytes) are left unencrypted. The next 16 bytes (e.g., at byte offset 160, B10) are encrypted as if they were the continuation of the first 16-byte encrypted block EB0, then the next 144 bytes are left unencrypted, and so on until the protected range ends.

Accordingly, AES-CBC encryption cannot be efficiently parallelized as encryption of each subsequent block depends on the result of encrypting the preceding block. In many cases the AES instruction takes more than a single CPU cycle. For example, an AES encryption in x86 processors may take as long as 7 cycles. On the other hand, some CPU architectures can have multiple units capable of executing AES encryption in parallel. Additional delays may also be incurred on some architectures due to loading a 16-byte block from a byte-aligned (not word-aligned) memory address, as only byte alignment can be guaranteed.

Figure 4:
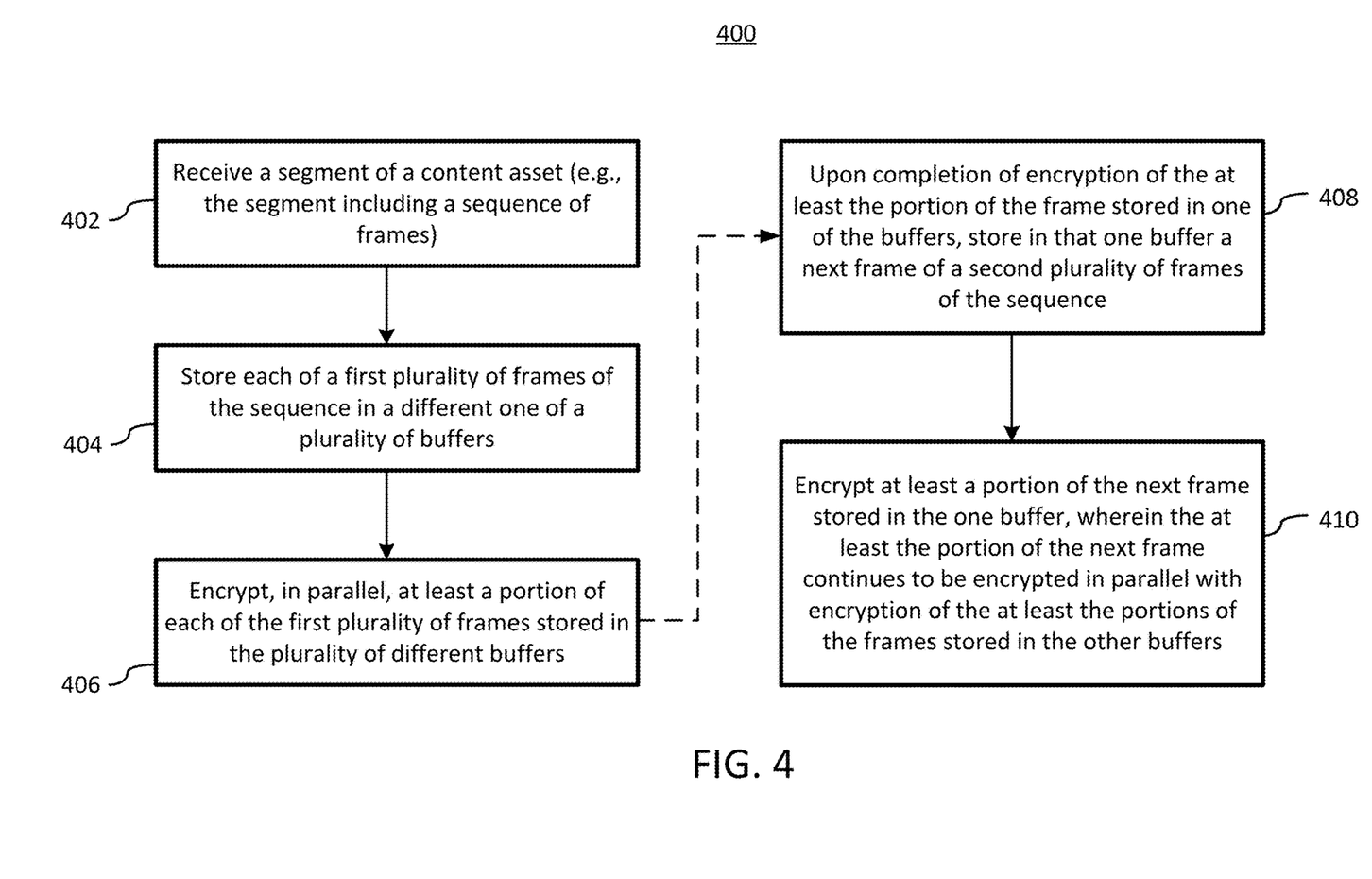
FIG. 4 shows an example method.

FIG. 4 shows an example method 400. At step 402, a segment of a content asset may be received. For example, the segment of the content asset may be an ISO-BMFF segment. The segment of the content asset may be received as a single content asset comprising a plurality of content segments, or may be received as a sequence of frames that together form a content segment. The content asset may be received, for example, by the content provider 102 shown in FIG. 1. The content asset may be any type of video asset, for example, a video clip, a movie asset, a television asset, a live broadcast asset such as a sporting event, an audio asset such as music streaming, or a Video on Demand (VOD) asset. However, it is understood that the content asset may be any type of content asset having any length or duration. The received segment of the content asset may include a sequence of frames. For example, if the content asset is a two-hour movie having a playback frame rate of 30 frames per second, the content asset may be received as 216,000 individual frames.

At step 404, each frame of a first plurality of frames of the sequence may be stored in a different buffer of a plurality of buffers. At step 406, at least a portion of each of the first plurality of frames stored in the plurality of different buffers may be encrypted separately and in parallel. For example, the encoder 104 shown in FIG. 1 may encrypt at least a portion of each of the first plurality of frames by providing an initialization vector to an encryption function and processing each buffer via a different instruction pipeline of a processor. Moreover, each buffer may contain a 16-byte block and the encryption function (e.g., an AES-CBC encryption function) may include a pattern of encrypted bytes. According to some embodiments, the processing of at least one buffer in one instruction pipeline may be offset from the processing of another buffer in another pipeline by one or more instruction cycles of the processor.

According to some embodiments, at step 408 and upon completion of encryption of the at least the portion of the frame stored on one of the buffers, a next frame of a second plurality of frames of the sequence may be stored in that one buffer. At step 410, at least a portion of the next frame stored in the one buffer may be encrypted, where the at least the portion of the next frame continues to be encrypted in parallel with encryption of the at least the portion of the frames stored in the other buffers.

In some embodiments, each user device configured to receive content from the content provider may be associated with a public key and a private key pair. While the public key may be known to the content provider and may be used to encrypt the frame, the private key used to decrypt the received frame may be known only to the user device. Thus, encoding a given frame of the content asset may comprise encrypting the given frame at the content provider using the public key associated with the user device. The frame may be encrypted in parallel with the encryption of one or more other frames, individually and separately from the remaining frames of the content asset. The frame may then be transmitted as part of a requested content segment (e.g., a 2 second segment) over a secure channel. Upon receipt of the content segment by the user device, the encrypted frame may be decrypted using only the private key associated with the user device. Thus, any user device that does not know the private key associated with that user device may not be able to decrypt the frame of the received content segment. While the embodiment above is described in the context of a public key and private key pair, it is understood that any type of encryption techniques may be used.

A content asset may comprise a number of different types of frames. For example, a content asset may comprise one or more of an I-frame, a P-frame of a B-frame. An I-frame (i.e., an intra-coded picture) may be a complete image such as a JPG or BMP image file. In contrast to I-Frames, P and B frames may hold only part of the image information (the part that changes between frames), so they may need less space in the output file than an I-frame. A P-frame (i.e., a predicted picture) may hold only the changes in the image from the previous frame. For example, in a scene where a car moves across a stationary background, only the car's movements need to be encoded. The encoder does not need to store the unchanging background pixels in the P-frame, thus saving space. P-frames are also known as delta-frames. AB-frame (i.e., a bidirectional predicted picture) saves even more space by using differences between the current frame and both the preceding and following frames to specify its content.

Figure 5:
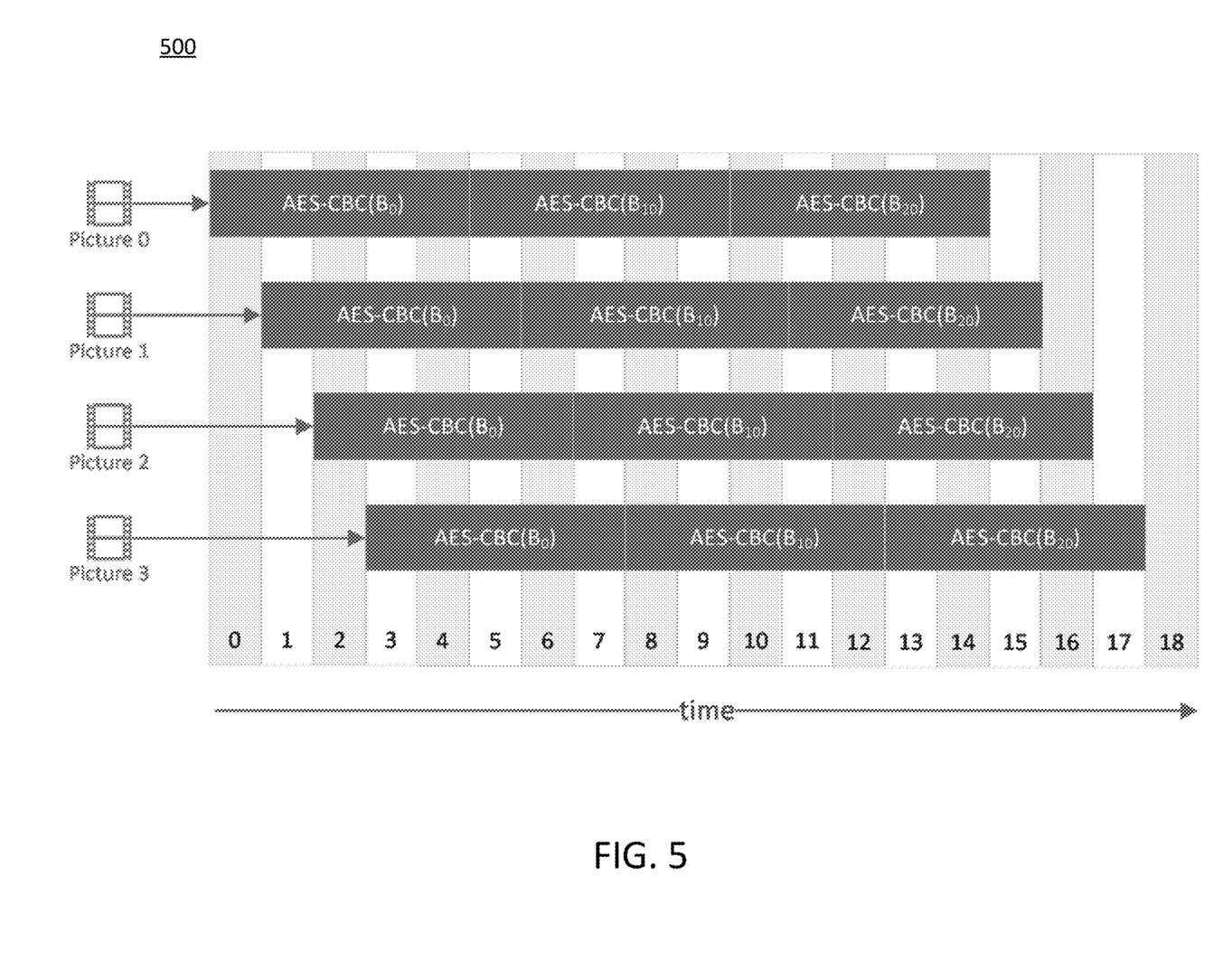
FIG. 5 shows an example method.

FIG. 5 shows an example implementation 500 of multi-sample encryption. According to some embodiments, a multi-sample approach to implementing AES encryption in CENC CBCS mode is provided. As shown in FIG. 5, the approach may be based on the structure of the CENC encryption standard, where each sample (e.g., segment of content asset) is independently encrypted.

For example, an AES-CBC encryption function may accept N greater than 1 buffers, each buffer of the N buffers (e.g., where N is greater than 1) representing M 16-byte blocks (e.g., where M is greater than 1), as well as an initialization vector for each of these N buffers. According to some embodiments, each of the N buffers may represent a single sample (e.g. picture or audio frame) in an ISO-BMFF segment. Each buffer may contain 16-byte blocks which need to be encrypted, with optional areas needed to be in the clear. The pattern of clear/encrypted bytes may be provided to an encryption function.

According to some embodiments, multi-message encryption is possible within a Transmission Control Protocol (TCP) stack, e.g., when multiple encrypted flows are simultaneously processed. For example, some Internet Protocol Security (IPsec) implementations may use multiple CPU pipelines to process multiple IP packets in parallel. In such implementations, the IP packets are of equal sizes and are processed in a continuous stream. Inefficiencies may result if samples (e.g., segments of a content asset) have different sizes and are processed in a serial fashion. For example, it may happen that an I frame has a size of 200 kilobytes (Kb), a P frame has a size of 50 Kb, and a non-reference B frame has a size of 20 Kb. If, for example, a sequence to be encrypted is IBBBP, and a number of buffers N equals 5, the first 20 Kb may be encrypted at full capacity, the next 30 Kb may be encrypted at 40% capacity, and the remaining 150 Kb may be encrypted at 20% capacity (i.e., the serial implementation). Given that a typical media segment may contain multiple samples (e.g. 120 frames in a 2-sec 60 fps segment), a more efficient scheduling can be achieved According to some embodiments, the buffers fed to the encryption function may have a limited number M of 16-byte blocks. For example, M may be at most the size of the largest frame or may be as small as, e.g., M equals 16 blocks. According to some embodiments, each buffer may initially correspond to a single frame. When one of the single frames is completed, the next frame may be used in the same buffer the next time the encryption function is called. According to some embodiments, the last encrypted block from a frame N may not be used with a frame N+1, e.g., the last result within the frame may be reused. Accordingly, the last encrypted block of each buffer may be retained and used as the initialization vector for the next round of encryption. Inefficiencies in a serial implementation are therefore reduced because at most M−1 cycles are not utilized for each frame, and each pipeline may run at full capacity.

According to some embodiments, blocks that will need to be encrypted (e.g., at a future time) may be fetched while the encryption function is running and buffers for a next invocation may be constructed in a scatter-gather operation. For example, segments may not fit level-1 (L1) or level-2 (L2) cache memory and loading a 16-byte block may entail non-aligned access to a level-3 (L3) cache memory or RAM (e.g., incurring additional latency). Bytes which are to be encrypted may be copied from their original locations in the multiple source frames to a non-sparse buffer (e.g., a buffer with no gaps between encrypted blocks). Latency may be reduced because the value of parameter M will depend on the latency of AES instruction(s) rather than depending on latency associated with unaligned memory access.

According to some embodiments, parameter M may also depend on the size of L1 cache. For example, all N*2 input and N*2 output buffers may fit into a part of the L1 cache in order to ensure minimal latency due to loading a 16-byte block into a CPU register. According to some embodiments, a gather operation (e.g., an operation that reads elements from memory and packs them in single instruction, multiple data register) may copy a number of contiguous blocks (e.g., B0, B10, B20 from FIG. 5) and record their location. The contiguous blocks may be copied to a non-sparse buffer (e.g., a buffer with no gaps between encrypted blocks) and the non-sparse buffer may be aligned to the CPU cache. After executing an AES encryption function, a scatter operation (e.g., an operation that unpacks packed data and then writes to individual memory locations) may write the now-encrypted blocks (e.g., EB0, EB10, EB20) back into their original location in memory.

According to an embodiment, Apple HLS (HTTP Live Streaming) implements a 100% CBC continuous encryption of segments. In this case, only multiple segments can be encrypted in parallel. Segments with a same sequence number but belonging to different video renditions, and even different media type (e.g. audio), may be parallelized using the above multi-buffer approach with multiple lower-rate segments scheduled in some buffers while the highest rate segment(s) may be scheduled on a single buffer.

According to some embodiments, a linear packager may output content at multiple resolutions at the same time. For example, in case of low-latency mode where each CMAF chunk contains a single sample, there may be no multi-frame parallelism to be used the described multi-buffer approach may be used with samples with identical or close decoding times.

Figure 6:
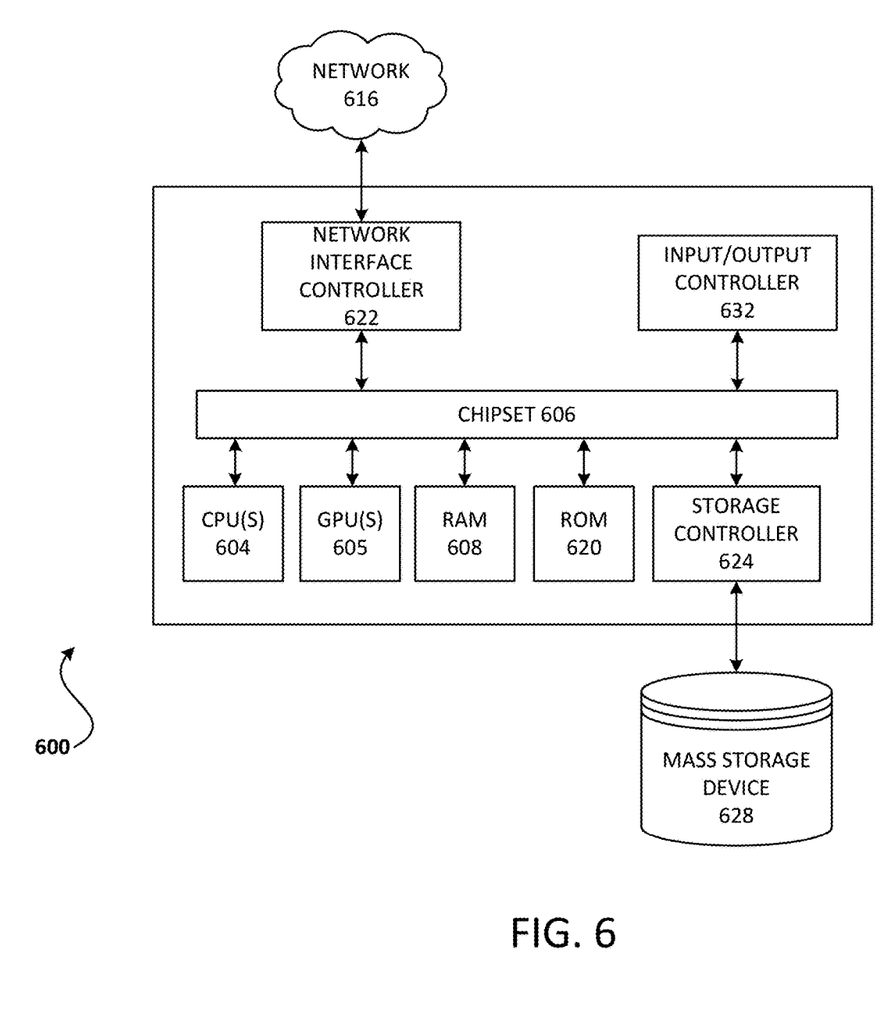
FIG. 6 shows an example computing device.

FIG. 6 depicts a computing device 600 that may be used to implement any of the computing systems, servers, modules, components, devices, storage subsystems, or other apparatus depicted or described in relation to FIG. 1. The computing device shown in FIG. 6 may comprise a server, computer, workstation, desktop computer, laptop, tablet, network appliance, PDA, e-reader, digital cellular phone, or other computing node or device, and may be utilized to execute any aspects of the methods described herein, such as the methods described and illustrated in relation to FIG. 2, 3, 4, or 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 1408 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. The operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the methods or apparatus described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIG. 2, 3, 4, or 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 1400 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving a segment of a content asset, wherein the segment comprises a sequence of video frames;
storing each of a first plurality of video frames of the sequence in a different one of a plurality of buffers;
encrypting, in parallel, at least a portion of each of the first plurality of video frames stored in the plurality of different buffers, wherein the encrypting, in parallel, the at least the portion of each video frame stored in the plurality of different buffers comprises processing each buffer via a different instruction pipeline of a processor, and wherein the processing of at least one buffer in one instruction pipeline is offset from the processing of another buffer in another pipeline by one or more instruction cycles of the processor.

2. The method of claim 1, further comprising:
upon completion of encrypting the at least the portion of the video frame stored in one of the buffers, storing in that one buffer a next video frame of a second plurality of video frames of the sequence; and
encrypting at least a portion of the next video frame stored in the one buffer, wherein the encrypting of the at least the portion of the next video frame continues in parallel with the encrypting of the at least the portions of the video frames stored in the other buffers.

3. The method of claim 1, wherein encrypting, in parallel, the at least the portion of each video frame stored in the plurality of different buffers comprises providing an initialization vector to an encryption function.

4. The method of claim 3, wherein each buffer contains a 16-byte block and the encryption function includes a pattern or encrypted bytes.

5. The method of claim 3, wherein the encryption function is an Advanced Encryption Standard Cipher Block Chaining (AES-CBC) encryption function.

6. The method of claim 1, wherein the segment of the content asset is an International Organization for Standardization base media file format (ISO-BMFF) segment.

7. The method of claim 1, wherein the sequence of video frames comprises a plurality of bytes stored at an original location, wherein encrypting, in parallel, the at least the portion of each video frame stored in the plurality of different buffers comprises copying the plurality of bytes from the original location to a non-sparse buffer, and wherein the non-sparse buffer is aligned with a central processing unit (CPU) cache.

8. A method comprising:
receiving, at a central processing unit (CPU), a segment of a content asset, wherein the segment comprises a sequence of video frames;
storing, by the CPU, each of a plurality of video frames of the sequence in a different one of a plurality of buffers, wherein a first video frame of the plurality of video frames is stored in a first buffer of the plurality of buffers and a second video frame of the plurality of video frames is stored in a second buffer of the plurality of buffers;
providing, by a first instruction pipeline of the CPU at a first clock cycle of the CPU, the first buffer to an encryption function; and
providing, by a second instruction pipeline of the CPU at a second clock cycle of the CPU, the second buffer to the encryption function, wherein encryption of the first video frame is performed simultaneously to encryption of the second video frame.

9. The method of claim 8, wherein a third video frame of the plurality of video frames is stored in a third buffer of the plurality of buffers, and wherein the method further comprises providing, by a third instruction pipeline of the CPU at a third clock cycle of the CPU, the third buffer to the encryption function, wherein encryption of the third video frame is performed simultaneously to encryption of the first video frame.

10. The method of claim 9, wherein a fourth video frame of the plurality of video frames is stored in a fourth buffer of the plurality of buffers, further comprising providing, by a fourth instruction pipeline of the CPU at a fourth clock cycle of the CPU, the fourth buffer to the encryption function, wherein encryption of the fourth video frame is performed simultaneously to encryption of the first video frame.

11. The method of claim 8, wherein a third video frame of the plurality of video frames is stored in the second buffer of the plurality of buffers, further comprising providing, by the second instruction pipeline of the CPU at a third clock cycle of the CPU, the second buffer to the encryption function, wherein encryption of the third video frame is performed simultaneously to encryption of the first video frame.

12. The method of claim 8, further comprising:
providing, by the first instruction pipeline of the CPU at the first clock cycle of the CPU, a first initialization vector to the encryption function; and
providing, by the second instruction pipeline of the CPU at the second clock cycle of the CPU, a second initialization vector to the encryption function.

13. The method of claim 8, wherein each buffer contains a 16-byte block and the encryption function includes a pattern of encrypted bytes.

14. The method of claim 8, wherein the encryption function is an Advanced Encryption Standard Cipher Block Chaining (AES-CBC) encryption function.

15. The method of claim 8, wherein the segment of the content asset is an International Organization for Standardization base media file format (ISO-BMFF) segment.

16. The method of claim 8, wherein at least one of the first buffer and the second buffer is a non-sparse buffer and the non-sparse buffer is aligned with a CPU cache.

17. A non-transitory computer-readable medium comprising instructions that, when executed, cause:
receiving a segment of a content asset, wherein the segment comprises a sequence of video frames;
storing each of a first plurality of video frames of the sequence in a different one of a plurality of buffers;
encrypting, in parallel, at least a portion of each of the first plurality of video frames stored in the plurality of different buffers, wherein the encrypting, in parallel, the at least the portion of each video frame stored in the plurality of different buffers comprises processing each buffer via a different instruction pipeline of a processor, and wherein the processing of at least one buffer in one instruction pipeline is offset from the processing of another buffer in another pipeline by one or more instruction cycles of the processor.

18. The non-transitory computer-readable medium of claim 17, wherein the instructions, when executed, further cause:
  upon completion of encrypting the at least the portion of the video frame stored in one of the buffers, storing in that one buffer a next video frame of a second plurality of video frames of the sequence; and
  encrypting at least a portion of the next video frame stored in the one buffer, wherein the encrypting of the at least the portion of the next video frame continues in parallel with the encrypting of the at least the portions of the video frames stored in the other buffers.

19. The non-transitory computer-readable medium of claim 17, wherein the instructions that, when executed, cause encrypting, in parallel, the at least the portion of each video frame stored in the plurality of different buffers, cause providing an initialization vector to an encryption function.

20. The non-transitory computer-readable medium of claim 19, wherein each buffer contains a 16-byte block and the encryption function includes a pattern or encrypted bytes.

21. The non-transitory computer-readable medium of claim 19, wherein the encryption function is an Advanced Encryption Standard Cipher Block Chaining (AES-CBC) encryption function.

22. The non-transitory computer-readable medium of claim 17, wherein the segment of the content asset is an International Organization for Standardization base media file format (ISO-BMFF) segment.

23. The non-transitory computer-readable medium of claim 17, wherein the sequence of video frames comprises a plurality of bytes stored at an original location, wherein the instructions that, when executed, cause encrypting, in parallel, the at least the portion of each video frame stored in the plurality of different buffers, cause copying the plurality of bytes from the original location to a non-sparse buffer, and wherein the non-sparse buffer is aligned with a central processing unit (CPU) cache.

24. A device comprising:
  one or more processors; and
  memory storing instructions that, when executed by the one or more processors, cause the device to:
  receive a segment of a content asset, wherein the segment comprises a sequence of video frames;
  store each of a first plurality of video frames of the sequence in a different one of a plurality of buffers;
  encrypt, in parallel, at least a portion of each of the first plurality of video frames stored in the plurality of different buffers, wherein the encrypting, in parallel, the at least the portion of each video frame stored in the plurality of different buffers comprises processing each buffer via a different instruction pipeline of a processor, and wherein the processing of at least one buffer in one instruction pipeline is offset from the processing of another buffer in another pipeline by one or more instruction cycles of the processor.

25. The device of claim 24, wherein the instructions, when executed by the one or more processors, further cause the device to:
  upon completion of encrypting the at least the portion of the video frame stored in one of the buffers, store in that one buffer a next video frame of a second plurality of video frames of the sequence; and
  encrypt at least a portion of the next video frame stored in the one buffer, wherein the encrypting of the at least the portion of the next video frame continues in parallel with the encrypting of the at least the portions of the video frames stored in the other buffers.

26. The device of claim 24, wherein the instructions that, when executed by the one or more processors, cause the device to encrypt, in parallel, the at least the portion of each video frame stored in the plurality of different buffers, cause the device to provide an initialization vector to an encryption function.

27. The device of claim 26, wherein each buffer contains a 16-byte block and the encryption function includes a pattern or encrypted bytes.

28. The device of claim 26, wherein the encryption function is an Advanced Encryption Standard Cipher Block Chaining (AES-CBC) encryption function.

29. The device of claim 24, wherein the segment of the content asset is an International Organization for Standardization base media file format (ISO-BMFF) segment.

30. The device of claim 24, wherein the sequence of video frames comprises a plurality of bytes stored at an original location, wherein the instructions that, when executed by the one or more processors, cause the device to encrypt, in parallel, the at least the portion of each video frame stored in the plurality of different buffers, cause the device to copy the plurality of bytes from the original location to a non-sparse buffer, and wherein the non-sparse buffer is aligned with a central processing unit (CPU) cache.

31. A system comprising:
  a first computing device configured to send a segment of a content asset; and
  a second computing device configured to:
  receive the segment of the content asset, wherein the segment comprises a sequence of video frames;
  store each of a first plurality of video frames of the sequence in a different one of a plurality of buffers;
  encrypt, in parallel, at least a portion of each of the first plurality of video frames stored in the plurality of different buffers, wherein the encrypting, in parallel, the at least the portion of each video frame stored in the plurality of different buffers comprises processing each buffer via a different instruction pipeline of a processor, and wherein the processing of at least one buffer in one instruction pipeline is offset from the processing of another buffer in another pipeline by one or more instruction cycles of the processor.

32. The system of claim 31, wherein the second computing device is further configured to:
  upon completion of encrypting the at least the portion of the video frame stored in one of the buffers, store in that one buffer a next video frame of a second plurality of video frames of the sequence; and
  encrypt at least a portion of the next video frame stored in the one buffer, wherein the encrypting of the at least the portion of the next video frame continues in parallel with the encrypting of the at least the portions of the video frames stored in the other buffers.

33. The system of claim 31, wherein the second computing device is configured to encrypt, in parallel, the at least the portion of each video frame stored in the plurality of different buffers by providing an initialization vector to an encryption function.

34. The system of claim 33, wherein each buffer contains a 16-byte block and the encryption function includes a pattern or encrypted bytes.

35. The system of claim 33, wherein the encryption function is an Advanced Encryption Standard Cipher Block Chaining (AES-CBC) encryption function.

36. The system of claim 31, wherein the segment of the content asset is an International Organization for Standardization base media file format (ISO-BMFF) segment.

37. The system of claim 31, wherein the sequence of video frames comprises a plurality of bytes stored at an original location, wherein the second computing device is configured to encrypt, in parallel, the at least the portion of each video frame stored in the plurality of different buffers by copying the plurality of bytes from the original location to a non-sparse buffer, and wherein the non-sparse buffer is aligned with a central processing unit (CPU) cache.

* * * * *